(12) United States Patent
Saika

(10) Patent No.: US 7,188,095 B2
(45) Date of Patent: Mar. 6, 2007

(54) SYSTEM AND METHOD FOR MANAGING A STORAGE DEVICE

(75) Inventor: Nobuyuki Saika, Yokosuka (JP)

(73) Assignee: Hitachi, Ltd., Tokyo (JP)

( * ) Notice: Subject to any disclaimer, the term of this patent is extended or adjusted under 35 U.S.C. 154(b) by 192 days.

(21) Appl. No.: 10/649,172

(22) Filed: Aug. 26, 2003

(65) Prior Publication Data
US 2004/0128325 A1 Jul. 1, 2004

(30) Foreign Application Priority Data
Dec. 24, 2002 (JP) ............................. 2002-371923

(51) Int. Cl.
G06F 17/30 (2006.01)
(52) U.S. Cl. .................... 707/1; 707/10; 707/200
(58) Field of Classification Search ........... 707/1–10, 707/103, 100, 200–206; 709/203, 213; 710/1, 710/5, 38
See application file for complete search history.

(56) References Cited

U.S. PATENT DOCUMENTS

| | | | |
|---|---|---|---|
| 6,415,280 B1 * | 7/2002 | Farber et al. ............ | 707/2 |
| 6,513,115 B2 | 1/2003 | Nock et al. | |
| 6,582,474 B2 * | 6/2003 | LaMarca et al. .......... | 715/500 |
| 6,625,604 B2 * | 9/2003 | Muntz et al. ............. | 707/9 |
| 6,766,314 B2 * | 7/2004 | Burnett ................... | 707/2 |
| 6,785,786 B1 * | 8/2004 | Gold et al. ............... | 711/162 |
| 2004/0024786 A1 | 2/2004 | Anderson et al. | |
| 2004/0122917 A1 | 6/2004 | Menon et al. | |
| 2004/0123026 A1 | 6/2004 | Kaneko | |

FOREIGN PATENT DOCUMENTS

JP A-08-305723 11/1993

* cited by examiner

Primary Examiner—Don Wong
Assistant Examiner—Marc Filipczyk
(74) Attorney, Agent, or Firm—Townsend & Townsend and Crew LLP

(57) ABSTRACT

A storage device system includes a storage control device with a file system for execution of data I/O processing relative to a storage device according to a data I/O request by means of file identifier assignment as sent from a host computer. A computer is connected between the host and the storage control device with a per-host accessible file storage region being reserved on the storage region of a storage device that the storage control device owns. The computer stores in a database a first correspondence established between a first ID which is added on a per-host basis and a file identifier which is added to a file that is stored in the file storage region and then compares to the first correspondence a correspondence between a first ID and a file identifier which is included in the data I/O request received from the host to thereby determine whether the received request is acceptable.

12 Claims, 9 Drawing Sheets

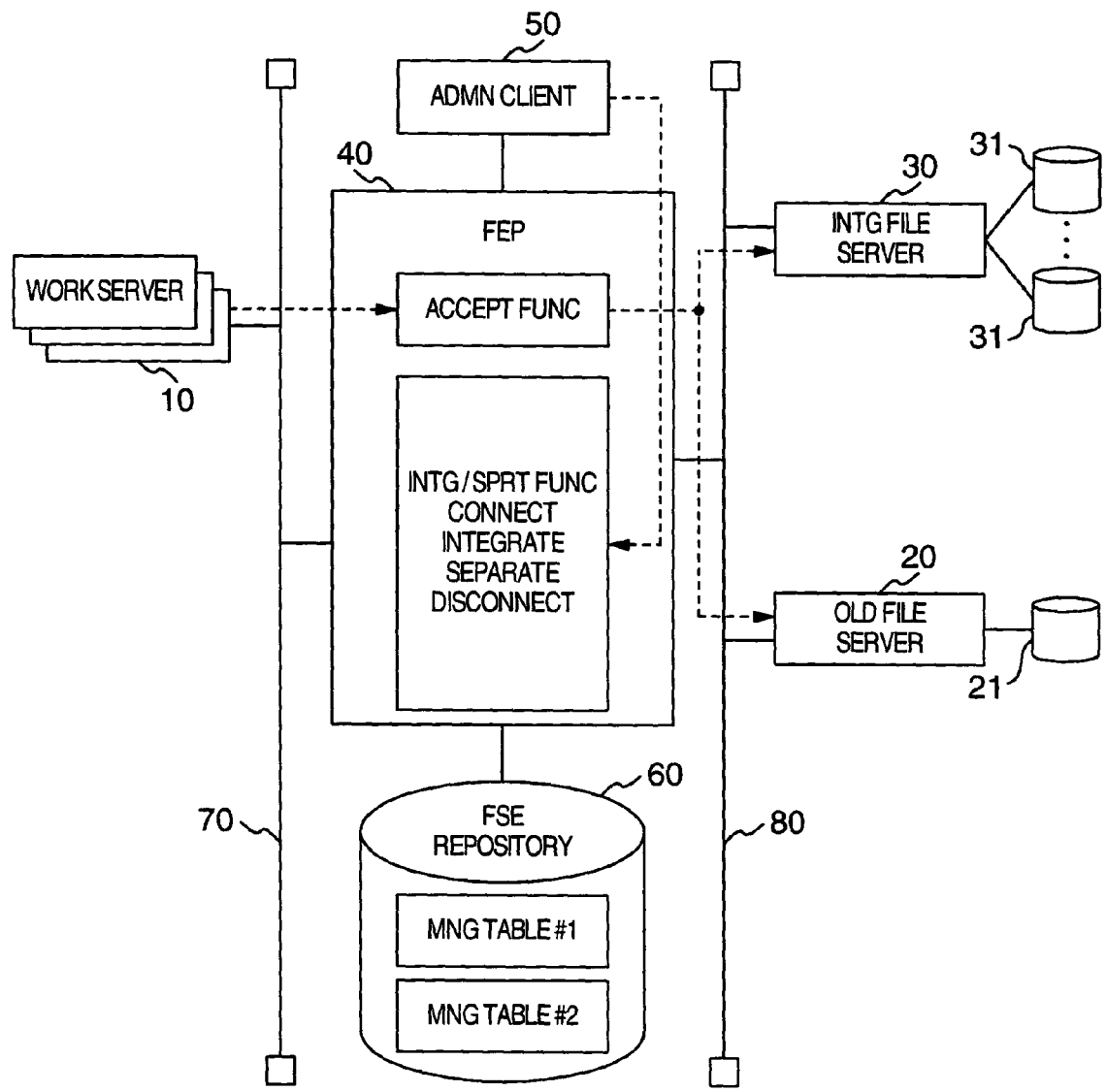

| WS IDNTFR | DIRECTORY |
|---|---|
| 192.168.1.1 | /HOME/WS NAME/OFS NAME |
| 192.168.1.2 | /HOME/WS NAME/OFS NAME |
| 192.168.1.3 | /HOME/WS NAME/OFS NAME |

<STATE TRANSITION CHART>

FIG.5

<STATE TRANSITION TABLE>

| EVENTS \ STATE | INI. | CONNECTING | CONNECTED | INTEGRATING | INTEGRATED | SEPARATING | DISCONNECTING |
|---|---|---|---|---|---|---|---|
| CNCT REQ | →CHANGE STATE TO CONNECTING THEN CONNECT | Error | Error | Error | Error | Error | Error |
| CNCT DONE | Error | →CHANGE STATE TO CONNECTED | Error | Error | Error | Error | Error |
| INTG REQ | Error | Error | →CHANGE STATE TO INTEGRATING THEN INTEGRATE | Error | Error | Error | Error |
| INTG DONE | Error | Error | Error | →CHANGE STATE TO INTEGRATED | Error | Error | Error |
| SPRT REQ | Error | Error | Error | Error | →CHANGE STATE TO SEPARATING THEN CONTINUE SEPARATION | Error | Error |
| SPRT DONE | Error | Error | Error | Error | Error | →CHANGE STATE TO CONNECTED | Error |
| CUT REQ | Error | Error | →CHANGE STATE TO DISCONNECTING THEN DISCONNECT | Error | Error | Error | Error |
| CUT DONE | Error | Error | Error | Error | Error | Error | →CHANGE STATE TO INI |

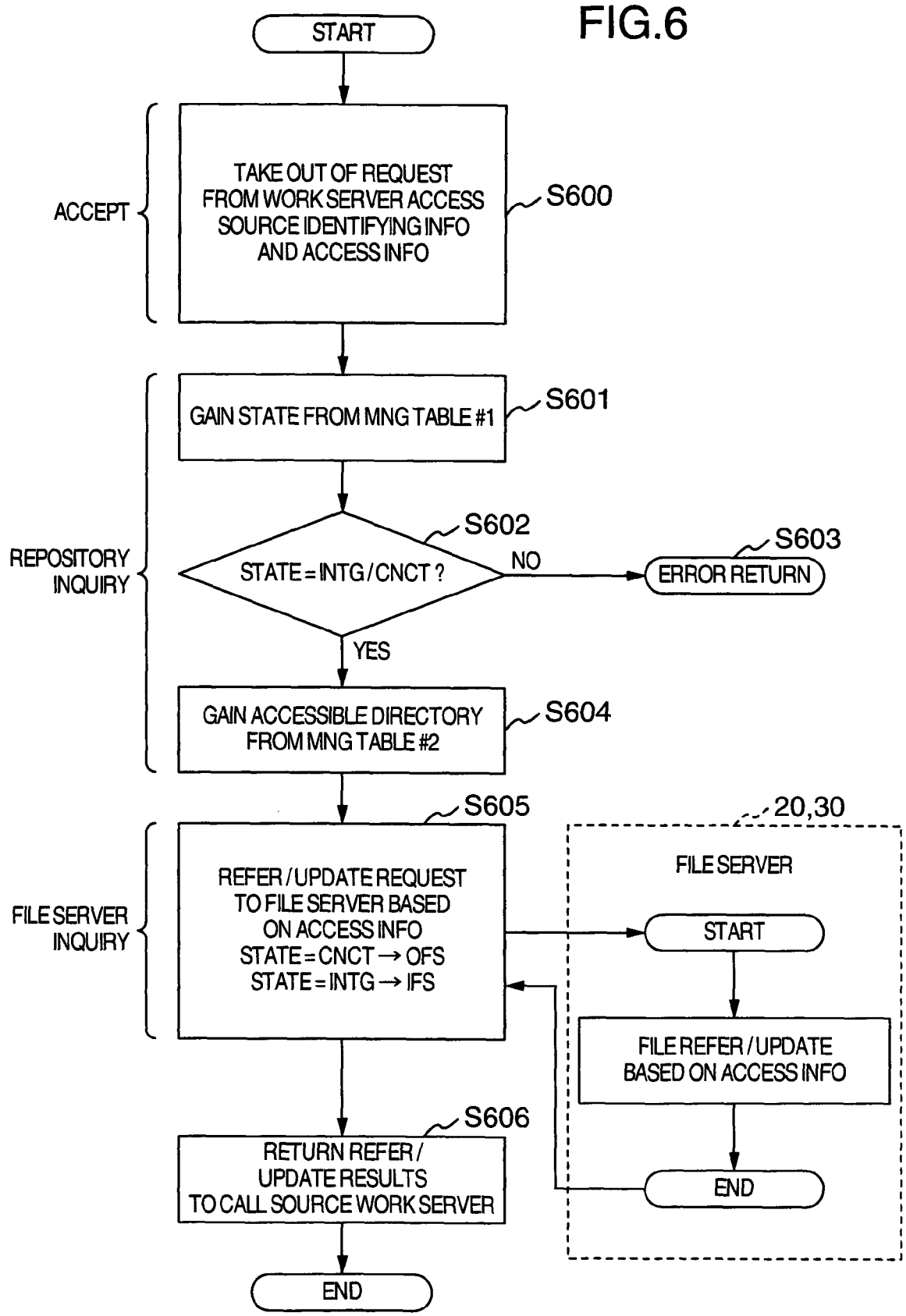

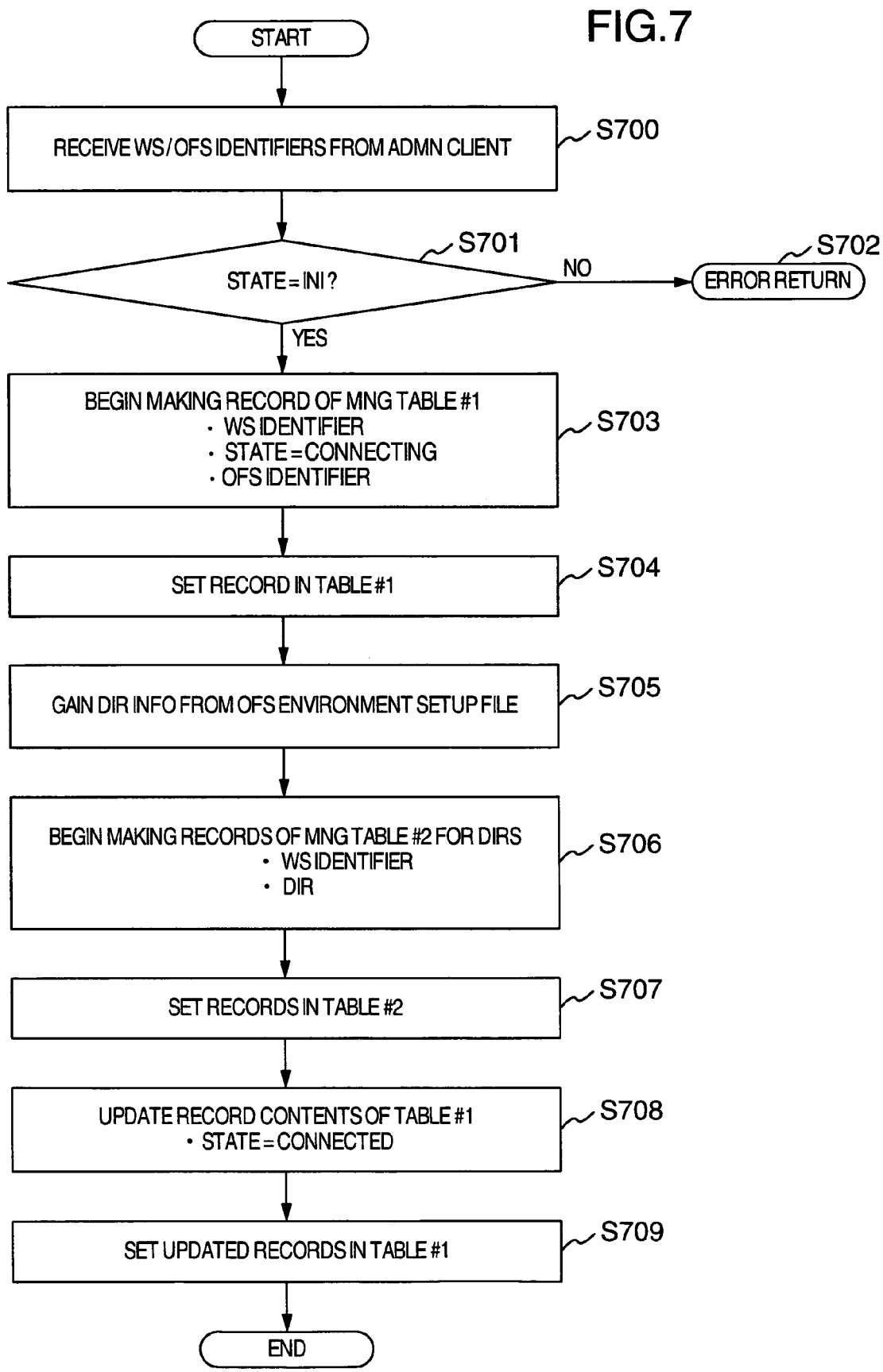

SYSTEM AND METHOD FOR MANAGING A STORAGE DEVICE

BACKGROUND OF THE INVENTION

The present invention relates to a control method of a storage device system, a computer, and a storage control device.

In recent years, in order to move with rapid advances in information system technologies, a chance increases of subcontracting intra-company information system handling work—such as system design, management, and maintenance services—to outside business entities such as a corporate data center or the like. This practice is known as the outsourcing.

Here, in many cases in the data center or the like, a previously used or "old" storage control device such as a file server or the like which has been conventionally used is directly transferred from a service user or subscriber (business company or organization of the outsourcing request source or client), for handling a storage device system (storage system) which is made up of a group of old storage control devices on a per-subscriber basis.

Note that such the storage device system is typically arranged in one form of a distributed database system. An example of this distributed database system technology is disclosed in JP-A-08-305723, which suggests a method for storing image data in a distributed database rather than storing an integrated version of the image data.

Incidentally, the old storage control device stated above is designed under an assumption that this device is used from a computer that is connected thereto via the service subscriber's installed local area network (LAN) so that the storage control device inherently lacks any mechanism which permits common shared usage among different service subscribers and among an increased number of unspecified users. Due to this, in the data center or the like, a need is felt to install and set up old storage control devices in units of service subscribers. This would result in an unwanted increase in installation space within the data center and also an increase in handling and maintenance costs.

On the other hand, in the recent years, the storage control devices including but not limited to disk array apparatus are becoming more greater in storage capacity and higher in performance. Under this circumstance, in the data center or the like, in order to cope with the above-noted increase in installation space and maintenance cost, it is required to effectively handle and manage the group of old storage control devices in units of service subscribers while at the same time letting them be integrated together into a new storage control device with larger storage capacity and higher performance.

Here, consider one case where a network attached storage (NAS) is implemented as the above-noted new storage control device. The NAS is designed to have a built-in file system to be LAN-connected for use, such as the Network File System (NFS), Common Internet File System (CIFS), or Direct Access File System (DAFS). In this case, NAS is operable to manage files which have been moved (duplicated) from more than one old storage control device by utilizing the common sharing function of the file system that the NAS owns by itself; however, in such case, a need arises to consolidate or unify the management of those files in which management information is written (referred to hereinafter as management information files) such as "/etc/ exports" files of a UNIX (registered trademark) based operating system (OS) or else.

Due to this, in cases where setup errors occur in the course of registration and maintenance of the above-noted management information files, its influence spreads and impacts upon the entirety of a host computer which acts as a service providing destination of the NAS. Additionally, since the NAS takes a system form to be directly coupled to the network of interest, it can easily receive unauthorized access from the outside while simultaneously suffering from risks of leakage of the management information files. To be brief, from a view point of service continuity and security reservation, in the data center or the like, any attempt is not made to integrate the old storage control devices such as file servers, resulting in increases in installation spaces within the data center and in handling/maintenance costs.

SUMMARY OF THE INVENTION

The present invention has been made in view of the problems stated above, and its object is to provide a control method of a storage device system, a computer, a storage control device, and a recording medium storing a program or programs.

In accordance with one aspect of this invention to attain the foregoing object, a control method for use in a storage device system is provided. The system includes more than one host computer and a first storage control device with a file system for receiving a data input/output request using file identifier assignment to be sent from the host computer via a communication path and for executing data input/output processing relative to a storage device in response to the request thus received. A computer is connected between the host computer and the first storage control device while being communicable with the host computer and the first storage control device. A first file storage region accessible on a per-host computer basis is reserved on a storage region of a storage device of the first storage control device per se. The computer is operable to i) store in a database a first correspondence relationship established between a first ID to be added per host computer and a file identifier being added to a file to be stored in the first file storage region, ii) receive the data input/output request as sent from the host computer, iii) compare the first correspondence to a correspondence which is included in the received request and established between the first ID of a host computer being specified as the sending source of the request and an identifier of a target file of the request to thereby determine whether the received request is acceptable or not, and iv) send the received request toward the first storage control device upon determination of accept of the received request. Note that in order to attain the object, a recording medium may be used which is arranged to store a program or programs for realization of the functions stated above.

These and other objects, features and advantages of the invention will be apparent from the following more particular description of preferred embodiments of the invention, as illustrated in the accompanying drawings.

BRIEF DESCRIPTION OF THE DRAWINGS

FIG. 1 is a diagram schematically showing an overall configuration of a storage device system in accordance with one embodiment of the present invention.

FIG. 2 shows a data structure of a management table #1 in accordance with the embodiment of this invention.

FIG. 5 is a state transition diagram relating to each shift state of from the old file server to integrated file server in a storage device system in accordance with the embodiment of the invention.

FIG. 6 is a processing flow concerning the accept function of a front end processor in accordance with the embodiment of the invention.

FIG. 7 is a flow diagram of connection processing of a front end processor in accordance with the embodiment of the invention.

DETAILED DESCRIPTION OF THE EMBODIMENTS

<Overview of Storage Device System>

Figures 3, 4:
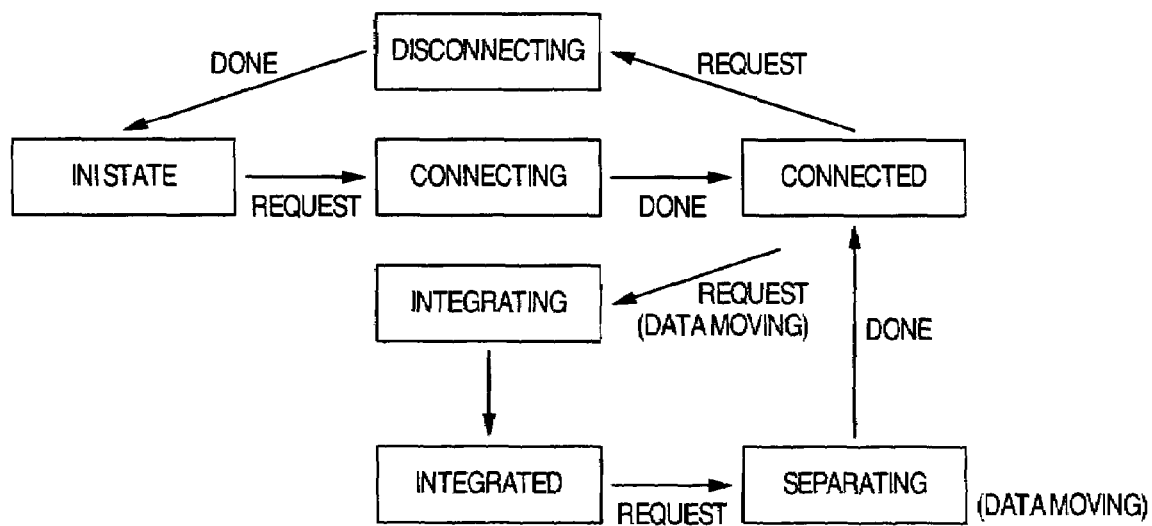
FIG. 3 shows a data structure of a management table #2 in accordance with the embodiment of the invention.
FIG. 4 is a state transition diagram relating to each shift state from an old file server to an integrated file server in a storage device system in accordance with the embodiment of the invention.

FIG. 1 shows a configuration of a storage device system (storage system) which will be set forth as one embodiment of the present invention. This storage device system is used and operated in an Internet data center (iDC) and others.

It should be noted here that the operation form for implementation to be assumed in FIG. 1 is such that in the iDC for example, one case is considered where a previously used or "old" file server 20 is integrally organized for continuous usage into a newly installed integrated file server 30 with respect to a storage device system in which the old file server 20 to be installed per service user or subscriber (business company or party or else) has been employed. Alternatively, the old file server 20 that has been transferred and moved under authorization from a service subscriber may be installed in the storage device system in which the integrated file server 30 has already been installed while letting the old file server 20 be integrated for practical use into the integrated file server 30.

Optionally, the old file server 20 after integration may be completely cut off from the storage device system in view of the installation spaces and handling/maintenance costs to thereby permit complete environmental transition or shift toward the system for handling using only the integrated file server 30; or alternatively, the old file server 20 may be continuously made operable in co-use with the integrated file server 30 to thereby act as a device which enhances or assists the functionality of the integrated file server 30.

Detailed explanation will now be given of constituent parts or components of the storage device system shown in FIG. 1 below.

As shown in FIG. 1, the storage device system is mainly configured from an ensemble of work servers (each is functionally equivalent to the "host computer" as claimed) 10, an old file server ("second storage control device") 20, an integrated file server ("first storage control device") 30, a front end processor ("computer") 40, a managing or administrating client 50, and a file server environment repository ("database") 60.

Note that the work servers 10 and the front end processor (FEP) 40 are connected via a first communication network 70 over a currently established worldwide collection of networks called the Internet (not shown in the drawing) or the like. On the other hand, the front end processor 40 and the old file server 20 and also the integrated file server 30 are connected together via a second communication network 80. The first communication network 70 and second communication network 80 are such that each may be a local area network (LAN) or wide area network (WAN) made up of TCP/IP protocol-based network hardware components, a special-use or "dedicated" communication line, or other similar suitable links.

Here, the work servers 10 are set in a state that each offers mutual recognizability of IP addresses or the like and is communicable with the front end processor 40 that is connected to the work server 10 per se via the first communication network 70. On the other hand, with respect to the old file server 20 and the integrated file server 30 which are connected via the second communication network 80 to this front end processor 40, the work servers 10 fail to offer the mutual IP address recognizability and thus are not set in any direct communicable state. Thus the security required is retained in the storage device system.

The individual work server 10 is an information processing device which functions as a server in either a service subscriber's own intra-office system or a backbone system thereof, which server is typically comprised of a computer, workstation, general-purpose computer or else. Alternatively the work server 10 may be office-use client equipment (not shown) that functions as a client in the above-stated system or the like.

The old file server 20 and integrated file server 30 are arranged so that one or a plurality of disk drive units or the like with the capability to provide a data storage region are mounted within a housing of each server. Optionally, storage devices 21 and 31 may be designed to be externally connected to the housing of each server via communication lines of the currently established small computer system interface (SCSI) standards. The storage devices 21, 31 are used and operated by a specified architecture or scheme, such as the redundant array of inexpensive disks (RAID) technology, by way of example.

Also note that in the old file server 20 and integrated file server 30, each has a file system for receiving a data input/output request based on file identifier (file name and/or directory or the like) assignment as sent from one of the work servers 10 and for executing data input/output processing relative to any one of the storage devices 21, 31 in accordance with such request. Examples of the file system stated supra are the NFS, CIFS and DAFS and other similar suitable ones. A typical example of the storage control device such as the disk array device with this file system built therein is a network attached storage (NAS) or equivalents thereto.

Note here that at the integrated file server 30, a first file storage region is reserved on the storage region of storage device 31 in a way depending upon the function of the file system owned by the server per se. Very importantly, this first file storage region is for use as a duplication-copy destination of those files to be stored in a second file storage region that is provided on the storage region of the storage device 21. This first file storage region is managed by the file server environment repository 60 to be described in detail later in such a way that this storage region can be accessed by one of the work servers 10 that corresponds to the old file server 20, which is presently expected to act as a file replication source.

Also note that the old file server 20 and integrated file server 30 are designed so that each stores therein a management information file (i.e. "third correspondence" as claimed). This file defines a correspondence relationship established between a first identification (ID) which is added to a work server 10 that can provide access to the server 20, 30 per se and a file identifier (file name, directory or else) which is added to a file that is stored in the second file storage region accessible or addressable by this work server 10. One example of this management information file is an "/etc/exports" file of the UNIX™ based OS or the like.

The front end processor 40 mainly functions as an interexchange or "relay" device between the work servers 10 on one hand and the old file server 20 and integrated file server 30 on the other hand, and is constituted from a personal computer (PC), workstation, general purpose computer, or equivalents thereof. In addition, the front end processor 40 is operable to provide an accept function and integration/separation functions as will be described later in the description.

The administrative client 50 is a terminal device which functions as a client that requests the front end processor 40, through an appropriate input interface means equipped by itself (such as a mouse, keyboard, touch panel or else), to execute certain processing as to the integration/separation function as will be later described, and is made up of a PC or workstation or equivalents thereto.

The file server environment repository 60 is a database (repository) which stores therein a management table #1 ("second correspondence") and a management table #2 ("first correspondence"). This file server environment repository 60 enables access to the stored data for manipulation and definition purposes only via a management software (not shown) of the file server environment repository 60, which is built in the front end processor 40.

Preferably, this management software has a mechanism for protection of the confidentiality of the data stored in the file server environment repository 60, such as encryption and user access authorization schemes. With such an arrangement, the data (management table #1 and management table #2) stored in the file server environment repository 60 are hardly subjected to any direct access by unauthorized accessing and hacking activities, resulting in achievement of enhanced security.

Turning to FIG. 2, there is shown one example of the data structure of the management table #1 discussed above. As shown herein, this management table #1 is a conversion or "map" table which defines a correspondence relationship established among a first ID such as an IP address or a work server name or the like as added to a work server 10, a status parameter with its content of any one of seven different states to be later described-namely, an initial state, connection processing in-process, connection ("first state"), integration processing in-process, integration ("second state"), separation processing in-process, and disconnect processing in-process—and a second ID such as an IP address or old file server name which is added to the old file server 20 that is accessible by this work server 10.

FIG. 3 shows an example of the data structure of the management table #2 stated supra. As shown herein, this management table #2 is a conversion or "map" table which provides the establishing of a correspondence between a first ID such as an IP address or work server name that is added to a work server 10 and a file identifier such as a file name or a directory or else which is added to a stored file of the first file storage region accessible by this work server 10.

It must be noted in FIG. 3 that a specific case is shown where the file identifier is, for example, a directory (referred to as accessible directory hereinafter) with a hierarchical structure which has a home directory "/home," a subdirectory of "/work server identifier (such as work server name or else)" which is formed at a lower level by one layer of the home directory, and another subdirectory of "old file server identifier (such as old file server name or else)" as formed at a further lower level by one layer of the aforesaid sub-directory.

More specifically, the stored files of the first file storage region are under file management by use of the accessible directory "/home/work server identifier/old file server identifier." A respective one of the work servers 10 of FIG. 1 is operable to mount a corresponding accessible directory on the storage region of a storage device equipped by itself through the front end processor 40, thereby enabling access (referring, updating, etc.) to any files that are present at locations below this accessible directory.

In addition, with the use of the accessible directory configuration stated above, it is possible to manage any duplicate-copied or replicated files upon integration from the old file server 20 in units of the old file server 20 and work servers 10—namely on a per-server basis. This in turn makes it possible to easily move or transfer (replicate) those files being managed at the integrated file server 30 toward the management at either the old file server 20 or its replacing-or alternative hardware machine (referred to as "new file server" hereinafter) which is a replication source of the original files thereof.

Note here that the management table #1 and management table #2 are organizable together into a single integrated management table due to the fact that the same item of "work server identifier" is involved in both of them. In the case of letting these tables be integrated into such single management table, it is preferable to perform at the file server environment repository 60 the storage management in a way independent of the management table #1 and the management table #2, because the table integration would sometimes result in occurrence of double registration and contradiction of the records involved.

In this way, with the storage device system in accordance with the present invention, the front end processor 40 as operatively interposed between the work servers 10 and the integrated file server 30 performs storage management while organizing into the form of a database any management information files (management table #1, management table #2 or the like) to be managed at the integrated file server 30.

Very importantly, the management information files are accessible only by the administrative client 50 with access authorization given thereto through the above-stated management software that the front end processor 40 owns. Thus it becomes possible to preclude both the spread of obstruction occurring due to setup errors of the management information files and the risk of unauthorized access and hacking activities from the outside. This in turn makes it possible to achieve increased system handleability while letting the old file server 20 that was installed per service user be merged into the integrated file server 30.

Another advantage of the storage device system incorporating the principles of the invention is that the system handling and operation using only the integrated file server 30 makes it possible to reduce or suppress increases in installation spaces and management/maintenance costs at the data center or the like. A further advantage lies in the capability to eliminate or minimize penalties concerning specification alteration and reconstruction otherwise required for a conventional storage control device that is used as the integrated file server 30.

<Storage Device System Control Method>

State Transition

Explanation will be given of several states during integration of from the old file server 20 to the integrated file server 30, by using a state transition diagram shown in FIG. 4 along with a state transition table shown in FIG. 5. Note that representative examples of the states as defined herein are seven different states which follow: "Initial State", "Connecting", "Connected ("first state")", "Integrating", "Integrated ("second state")", "Separating", and "Disconnecting".

Respective states will be set forth below.

Initial State: This indicates a state that the old file server 20 and the integrated file server 30 are not communicable with each other via the second communication network 80. In this case, any records are absent in the management table #1, which correspond to the second ID of the old file server 20 to be integrated and the first ID of a work server 10 that can provide access to this old file server 20.

Connecting: This indicates a state in process of transition from the initial state to the connected state in cases where certain events occur for issuance of a connection request from the administrative client 50 to the front end processor 40.

Connected State: This indicates a state that the old file server 20 and the integrated file server 30 plus the front end processor 40 are mutually recognizable and thus communicable via the second communication network 80. In this case, more than one record is created in the management table #1, which record includes a correspondence established between the second ID of the old file server 20 and the first ID of a work server 10 being presently accessible to this old file server 20. Note that in this state, a file duplication copy or replication of from the old file server 20 to the integrated file server 30 is not carried out yet. Due to this, the front end processor 40 transfers to the old file server 20 a data input/output request as received from a work server 10 and then returns any reply from this old file server 20 to the work server 10.

Integrating: This indicates a state in process of transition from the connected state to the integrated state in case certain events occur for issuance of an integration request from the administrative client 50 to the front end processor 40.

Integrated State: This indicates a state that the old file server 20 and the integrated file server 30 along with the front end processor 40 are mutually recognizable and communicable via the second communication network 80, and further the file replication was done from the old file server 20 to the integrated file server 30.

Separating: This indicates a state in process of transition from the integrated state to the connected state in cases where separation request events occur from the administrative client 50 to the front end processor 40.

Disconnecting: This indicates a state in process of transition from the connected state to the initial state in case disconnect request events take place from the administrative client 50 to the front end processor 40.

Above is the explanation of each state. The front end processor 40 uses a status parameter with its content equal to any one of these seven states to thereby control the processing as to its own built-in accept function and integrate/separate functions (connecting, integrating, separating and disconnect processing). Below is an explanation of the processing as to the front end processor 40's own accept function and integrate/separate functions.

Accept Function

FIG. 6 is a flow diagram for explanation of a processing flow concerning the accept function of the front end processor 40. Note that the processing as to this accept function is such that accept processing, repository inquiry processing and file server inquiry processing to be later described are performed sequentially, by way of example.

[Accept Processing]

Firstly, when receiving a data input/output request using file identifier (fine name and/or directory) assignment from a work server 10 via the first communication network 70, the front end processor 40 acquires items of interest included in the data input/output request, such as the first ID of the work server 10 which acts as a transmission source of this request and the file identifier to be processed of this request (at step S600 of FIG. 6). Additionally, NFS protocol is employable as the protocol of the above-noted data input/output request.

[Repository Inquiry Processing]

Next, the front end processor 40 compares the first ID thus acquired to a first ID which is present in each record of the management table #1 that is stored in the file server environment repository 60, and then acquires from the management table #1 a status parameter which corresponds to a concordant first ID that is found matched through this comparison (at step S601 of FIG. 1).

Here, determine whether the content of the status parameter thus obtained is "Integrated" or "Connected" (at step S602). In case the determination at step S602 results in that the content of the status parameter is neither the "Integrated" nor "Connected", that is, if NO at step S602, then send back to the work server 10 that is the transmission source of this request an error message saying that this request is not acceptable (at step S603). Note that in case the content of the status parameter is in a state other than "Integrated" or "Connected" (except "Initial State"), it is preferable that a retry which restarts from the accept processing be recurrently executed for a prespecified number of times.

On the other hand, when the determination at step S602 results in that the content of the status parameter is either "Integrated" or "Connected", namely, if YES at step S602, then determine to accept the request. Then, the front end processor 40 compares a correspondence established between the acquired first ID and the file identifier to the management table #2 that is stored in the file server environment repository 60. As a result of this comparison, acquire from the management table #2 an accessible directory which is present in a record that coincides with the correspondence between the acquired first ID and the file identifier (at step S604). Optionally this operation at step S604 may be performed simultaneously at step S602.

It should be noted that the content of the status parameter will be utilized in the processing as to the integrate/separate functions to be later described. Due to this, the repository inquiry processing stated above may be designed as the processing that inquires with respect to the integrate/separate functions to be later described.

[File Server Inquiry Processing]

Next, when the content of the status parameter acquired at step S602 is "Connected", the front end processor 40 sends the data input/output request received at step S600 toward the old file server 20. At the old file server 20, access (referring, updating or else) of this file is executed in accordance with the request as received from the front end processor 40; then, send its execution result back to the front end processor 40 (at step S605).

On the other hand, when the content of the status parameter acquired at step S602 is "Integrated", the front end processor 40 makes the file identifier acquired at S600 correspond to the accessible directory obtained at S604. And, use this accessible directory to issue a request which responds to the data input/output request as received at S600 and then send it to the integrated file server 30. At the integrated file server 30, access (referring, updating, or else) of this file is executed in accordance with the request received from the front end processor 40; then, send its execution result back to the front end processor 40 (at S605).

The front end processor 40 sends to the work server 10 that is the transmission source of the request an execution result of the file access as received from either the old file server 20 or the integrated file server 30 (at S606).

As apparent from the foregoing, in the storage device system in accordance with the invention, use of this accept function of the front end processor 40 makes it possible to achieve the handling of the integrated file server 30 with respect to any one of the work servers 10 while at the same time attaining enhanced security. This in turn makes it possible to reduce or suppress the installation space and management/maintenance cost in the data center or the like. Furthermore, it is possible for a conventional storage control device being used as the integrated file server 30 to eliminate or minimize the penalties as to specification alteration and system reconstruction otherwise required therefor.

In addition, using the accept function of this front end processor 40 makes it possible to permit the old file server 20 which is presently in a state that the integration toward the integrated file server 30 is not implemented yet (i.e. this state is equivalent to "Connected" stated above) to be operated and handled in such a way that this old file server 20 coexists with the integrated file server 30. This enables effective utilization of the old file server 20.

Integrate/Separate Function (Connect Processing)

Explanation will next be given of the connection processing of the front end processor 40 with reference to a flowchart of FIG. 7. Note here that the connect processing to be described below refers to certain processing for letting the old file server 20 and integrated file server 30 plus front end processor 40 be mutually recognizable and communicable via the second communication network 80 in the storage device system.

First, the front end processor 40 receives, via an input interface equipped by either the administrative client 50 or the processor per se, a connection request which includes specific IDs such as the second ID of old file server 20 that is an object to be connected to the second communication network 80 and the first ID of a work server 10 that is presently accessible to this old file server 20 (at step S700).

The front end processor 40 compares the correspondence established between the first ID and second ID which are included in the connect request as received at step S700 to a correspondence between first and second IDs on the management table #1 that is stored in the file server environment repository 60. Then acquire a status parameter from a record that involves a concordant correspondence between first and second IDs, which is found matched by this comparison; next, determine whether its content is "Initial State" or not (at step S701).

In case the content of the status parameter acquired is not "Initial State," that is, if NO at step S701, then the front end processor 40 sends back to the work server 10 that is a sending source of the connect request an error message saying that this request is not accepted (at step S702).

On the other hand, when the content of the status parameter acquired is "Initial State", i.e. if YES at step S701, then the front end processor 40 creates and prepares in the management table #1 stored in the file server environment repository 60 a new record which establishes a correspondence among the received first ID and the "Connecting (status parameter)" and also the received second ID (at step S703). Additionally this record thus prepared is stored in the management table #1 (at step S704).

The front end processor 40 sends forth toward the old file server 20 an access request which includes the received first ID and others. Note here that this access request is a request for allowing the work server 10 which is the send source of this connect request to acquire an accessible file identifier (file name, directory, etc.) from the management information file as stored in the old file server 20. In this case the old file server 20 acquires the accessible file identifier from the management information file that is stored in this server per se based on the first ID as included in the received access request, by way of example, and then sends it to the front end processor 40 (at step S705).

The front end processor 40 prepares a new record indicating a correspondence established between the file identifier received from the old file server 20 and the first ID received at step S700 (at step S706). And, the front end processor 40 stores this prepared record in the management table #2 (at step S707) and then changes the content of the status parameter included in the record that was created at S703 to "Connected" (at step S708), and next stores it in the management table #1 (at S709).

As the storage device system in accordance with the invention is arranged to have a unique mechanism or scheme of the above-noted connect processing in the front end processor 40, it is possible to improve the convenience in handling and maintenance of the storage device system. In addition, the management information of the management tables #1 and #2 or the like, in which more than one new record is created by execution of this connect processing, are under storage management as a database at the file server environment repository 60; thus, it is possible to perform unified management or consolidation while assuring enhanced security.

Integrate/Separate Function (Integrate Processing)

Figure 8:
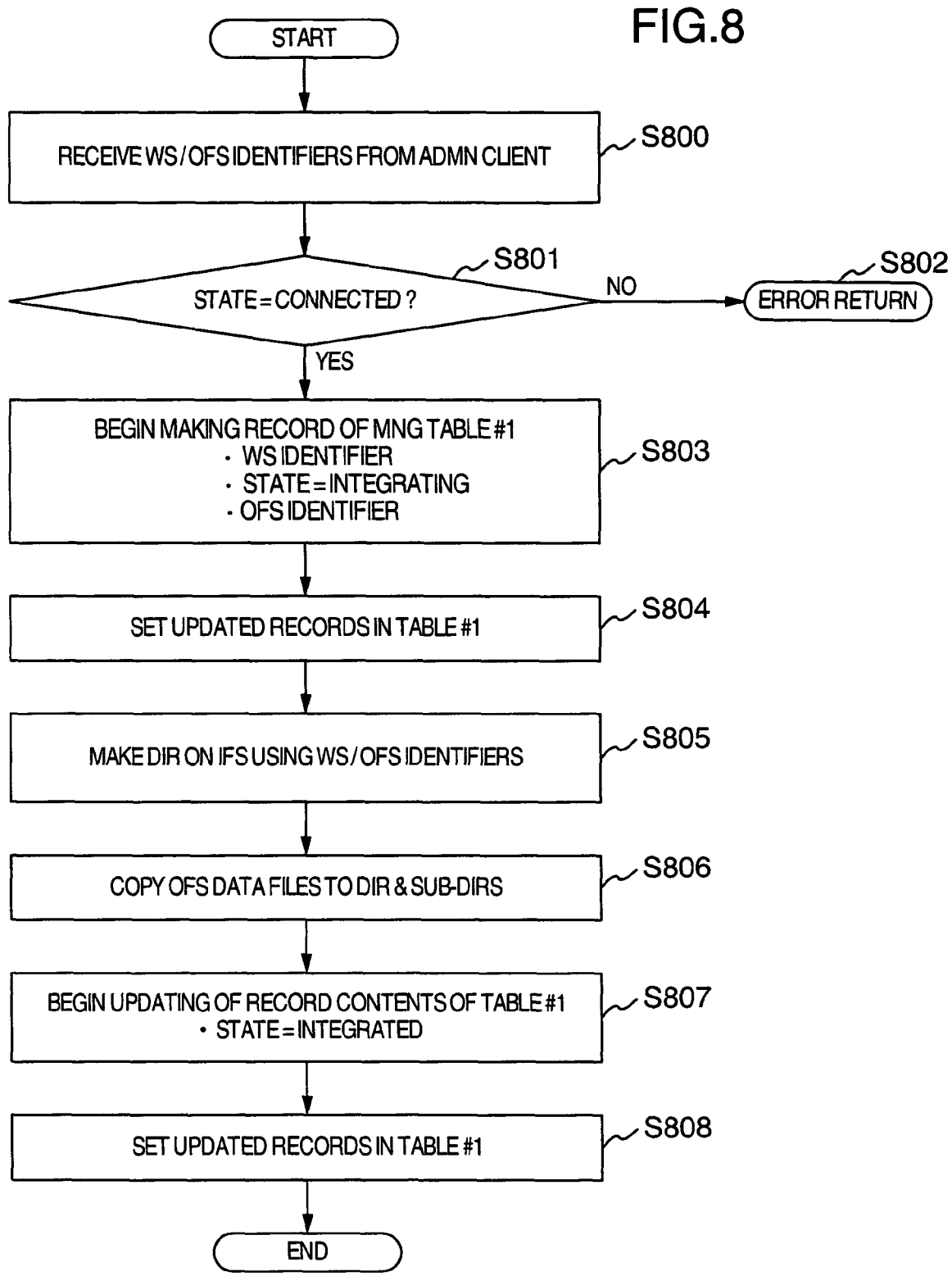
FIG. 8 is a flow diagram of integration processing of a front end processor in accordance with the embodiment of the invention.

Explanation will next be given of the integration processing of the front end processor 40 with reference to a flowchart of FIG. 8.

Note here that the integrate processing to be described below refers to certain processing for setting up a specific state that the old file server 20 and integrated file server 30 plus front end processor 40 are mutually recognizable and communicable via the second communication network 80, with file replication having been done from the old file server 20 to the integrated file server 30.

First, the front end processor 40 receives via the input interface equipped by either the administrative client 50 or the processor per se an integration request which includes IDs such as the second ID of the old file server 20 that is presently connected to the second communication network 80 and the first ID of a work server 10 that is accessible to this old file server 20 (at step S800).

The front end processor 40 compares the correspondence established between the first ID and second ID which are included in the integrate request as received at step S800 to a correspondence between first and second IDs on the management table #1 that is stored in the file server environment repository 60. Then acquire a status parameter from a record that includes a concordant correspondence between first and second IDs which is found matched by this comparison; next, judge whether its content is the "Connected" state or not (at step S801).

When the content of the status parameter thus acquired is not "Connected," that is, if NO at step S801, then the front end processor 40 sends back to the work server 10 that is a sending source of the integrate request an error message saying that this request is rejected (at step S802).

On the other hand, when the content of the status parameter acquired is "Connected," i.e. if YES at step S801, then the front end processor 40 prepares in the management table #1 stored in the file server environment repository 60 a new record which indicates the establishing of a correspondence among the received first ID, the "Integrating (status parameter)" and the received second ID (at step S803). Additionally this record thus prepared is stored in the management table #1 (at step S804).

Next, the front end processor 40 creates, on the storage region of a storage device(s) 31 the integrated file server 30 owns, an accessible directory which is corresponded in relationship to the received first and second IDs and then reserves a first file storage region which is subjected to file management at this accessible directory (at step S805).

Then, the front end processor 40 makes duplicate copies of the files which are stored in a second file storage region of the old file server 20 with the received second ID added thereto in the first file storage region that was reversed at step S805 (at step S806). In addition, the front end processor 40 changes the content of the status parameter included in the record that was created at S803 to "Integrated" (at step S807), and then stores it in the management table #1 (at S808).

It is noted that in case the old file server 20 and integrated file server 30 plus front end processor 40 are set in the state that these are mutually recognizable and communicable via the second communication network 80, the front end processor 40 may be modified to automatically start up the above-noted integrate processing with an appropriate time cycle. Alternatively, the front end processor 40 may successively initiate, without any appreciable interruption, the integrate processing from the connected state stated supra.

As the storage device system in accordance with the invention is arranged to have a unique mechanism or scheme of the above-noted integrate processing in the front end processor 40, it is possible to easily perform the integration procedure of the old file server 20 while at the same time providing enhanced security, thereby making it possible to improve the convenience in handling and maintenance of the storage device system.

In addition, the integrated file server 30 uses the accessible directory that was prepared during the above-stated integrate processing to manage those files that are replicated upon integration from the old file server 20 in units of servers 10, 20—namely, in a way independent of the old file server 20 and work server 10. Thus it is possible to easily transfer (duplicate-copy or replicate) the files to be managed at the integrated file server 30 toward the management at a new file server (not depicted) that is employed as either the old file server 20 or its replacing hardware machine, which is the copy source of the original files thereof.

Integrate/Separate Function (Separate Processing)

Figure 9:
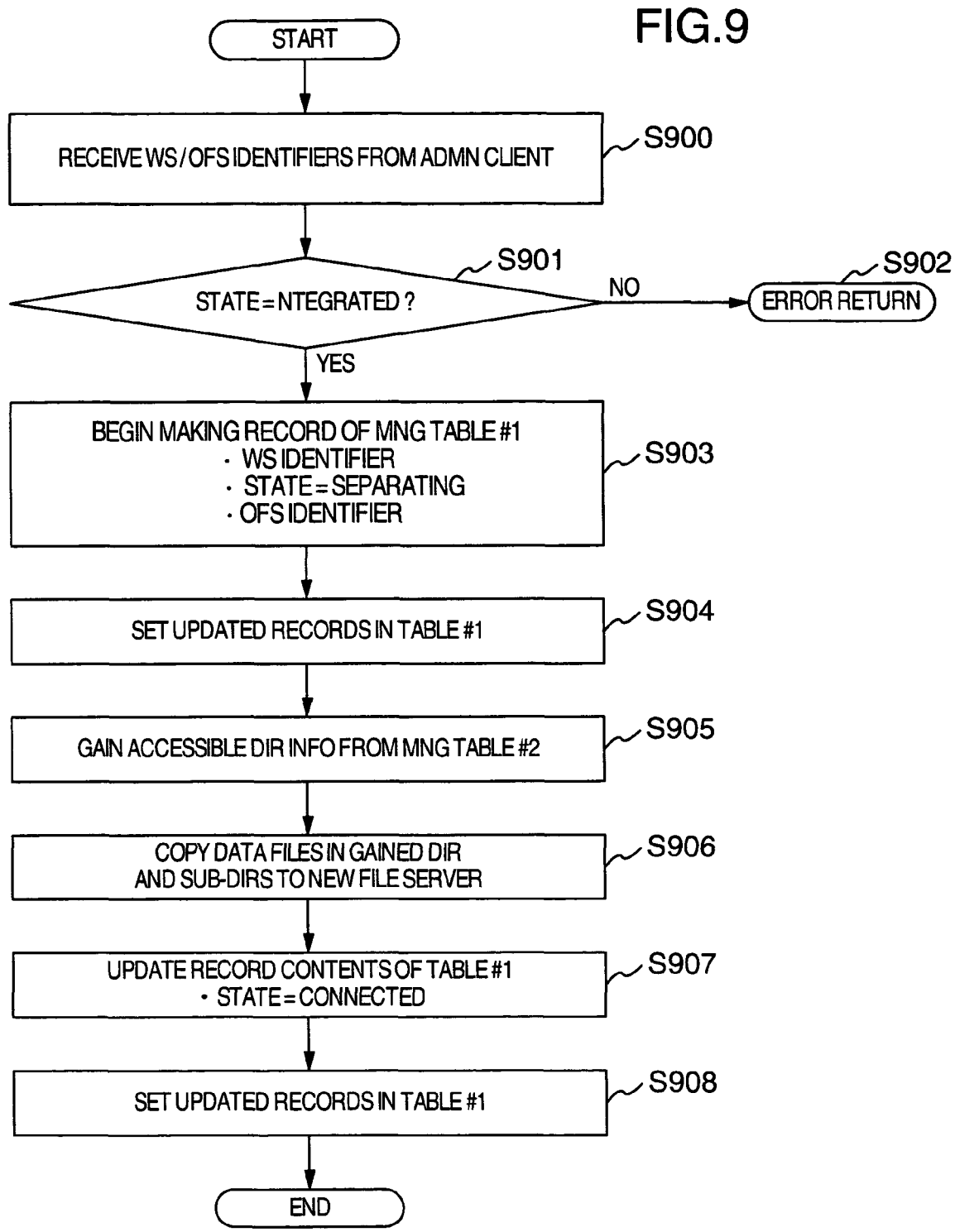
FIG. 9 is a flowchart of separation processing of a front end processor in accordance with the embodiment of the invention.

Explanation will next be given of the separation processing of the front end processor 40 with reference to a flowchart of FIG. 9.

Note here that the integrate processing to be explained below is certain processing for again shifting or "reshifting" (reduplicating) the files to be managed at the integrated file server 30 toward the management at the old file server 20 (alternatively the new file server equivalent to the "second storage control device" as claimed) which is the duplicate copy source of the original files thereof. Also note that this situation may arise in some cases—for example, when obstacles occur in the integrated file server 30 and also when the integrated file server 30 must be temporarily interrupted in operation at the time of maintenance.

First, the front end processor 40 receives via the input interface equipped by either the administrative client 50 or the processor per se a separation request which includes specific IDs such as the second ID of the old file server 20 (or new file server) that is presently connected to the second communication network 80 and the first ID of a work server 10 that can provide access to this old file server 20 (or new file server) (at step S900).

The front end processor 40 compares the correspondence between the first ID and second ID which are included in the separate request as received at step S900 to a correspondence between first and second IDs on the management table #1 that is stored in the file server environment repository 60. Then the front end processor 40 acquires a status parameter from a record that includes the correspondence between first and second IDs which is found matched by this comparison; and next, judges whether its content is the "Integrated" state or not (at step S901).

In case the content of the status parameter thus acquired is not "Integrated," that is, if NO at step S901, then the front end processor 40 sends back to the work server 10 that is a sending source of the separate request an error message saying that this request is rejected (at step S902).

On the other hand, when the content of the status parameter acquired is "Integrated," i.e. if YES at step S901, then the front end processor 40 creates in the management table #1 stored in the file server environment repository 60 a new record which indicates the establishing of a correspondence among the received first ID, the "Separating (status parameter)" and the received second ID (at step S903). Additionally this record thus prepared is stored in the management table #1 (at step S904).

Next, the front end processor 40 acquires or fetches an accessible directory that is corresponded to the received first ID from within the management table #2 that is stored in the file server environment repository 60 (at step S905).

The front end processor 40 makes duplicate copies of a file or files being presently stored in a first file storage region which is subjected to execution of file management by this obtained accessible directory in the second file storage region of the old file server 20 (or new file server) (at step S906). In addition, the front end processor 40 changes the content of the status parameter thus created at S903 to "Connected" (at step S907); then, stores it in the management table #1 (at S908).

Since the storage device system in accordance with the invention is arranged to comprise a unique mechanism or scheme of the above-noted separate processing of the front end processor 40, it is possible to easily transfer or shift those files being managed at the integrated file server 30 toward the management at the old file server 20 (or new file server) while attaining enhanced security. Thus it becomes possible to improve the convenience in handling of the storage device system.

Integrate/Separate Function (Disconnect Processing)

Figure 10:
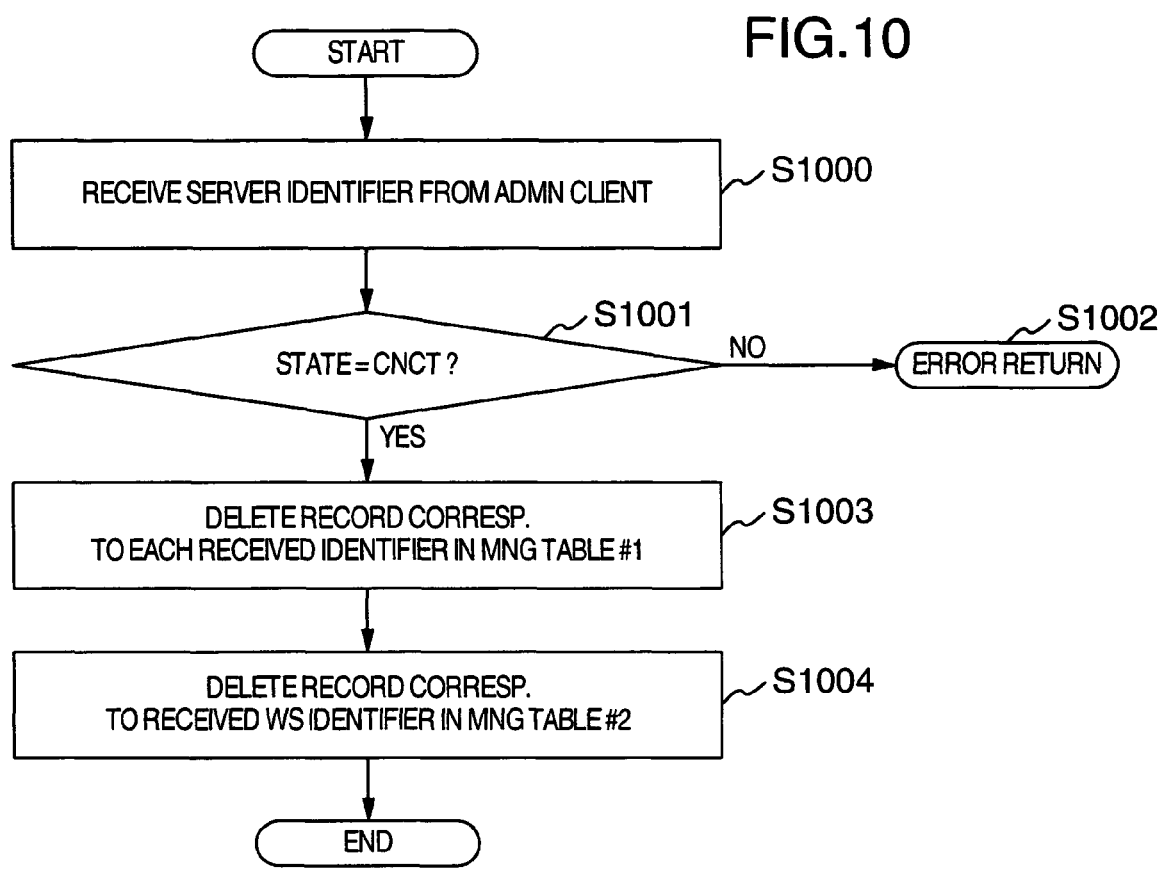
FIG. 10 is a flowchart of disconnection processing of a front end processor in accordance with the embodiment of the invention.

Explanation will next be given of the disconnection processing of the front end processor 40 with reference to a flowchart of FIG. 10.

Note that the disconnect processing to be explained below is certain processing for making a state change from the state that the old file server 20 (or new file server) and integrated file server 30 plus front end processor 40 are mutually recognizable and communicable via the second communication network 80 to the state that the old file server 20 is incapable of communicating with the integrated file server 30 and front end processor 40. This situation may take place in some cases—for example, when the intended integration of the old file server 20 has been established resulting in handling of only the integrated file server 30.

Firstly the front end processor 40 receives via the input interface equipped by either the administrative client 50 or the processor per se a disconnect request which includes specific IDs such as the second ID of the old file server 20 (or new file server) that is presently connected to the second communication network 80 and the first ID of a work server 10 that can provide access to this old file server 20 (or new file server) (at step S1000).

The front end processor 40 compares the correspondence established between the first ID and second ID which are included in the disconnect request as received at step S1000 to a correspondence between first and second IDs on the management table #1 that is stored in the file server environment repository 60. Then acquire a status parameter from a record that includes the correspondence between first and second IDs which is found matched by this comparison; next, determine whether its content is the "Connected" state or not (at step S1001).

In case the content of the status parameter acquired is not "Connected," that is, if NO at step S1001, then the front end processor 40 sends back to the work server 10 that is a sending source of the disconnect request an error message saying that this request is not acceptable (at step S1002).

On the other hand, when the content of the status parameter acquired is "Connected," that is, if YES at step S1001, then the front end processor 40 deletes from the management table #1 being stored in the file server environment repository 60 any record that includes the correspondence between the first and second IDs as matched to the correspondence between the received first and second IDs (at step S1002). Similarly, delete from the management table #2 stored in the file server environment repository 60 any record that includes the first ID that coincides with the first ID received.

Optionally in the disconnect processing stated above, the front end processor 40 may be designed to successively start up the disconnect processing without any interruption from the separate processing, rather than initiating the disconnect processing in response to receipt of a disconnect request from the administrative client 50 or else.

As the storage device system in accordance with the invention is arranged to come with a unique mechanism or scheme of the above-stated disconnect processing of the front end processor 40, it becomes possible to improve the convenience as for the handling of the storage device system while simultaneously enabling handling by use of the integrated file server 30 alone. Thus it is possible to reduce any possible unwanted increases in installation spaces and management/maintenance costs in the data center or the like.

Other Embodiments

Figure 11:
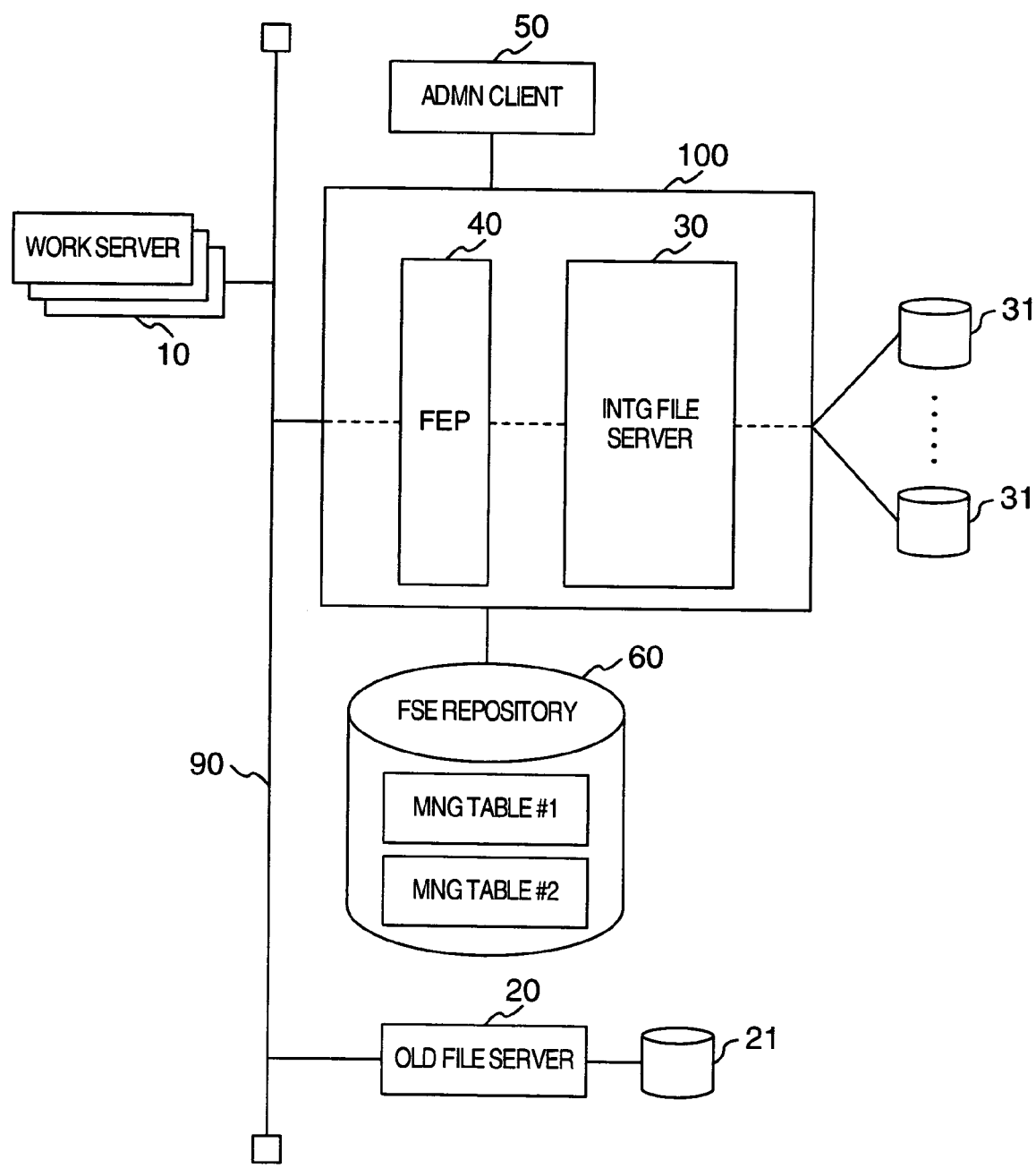
FIG. 11 is a schematic diagram showing a configuration of a storage device system in accordance with another embodiment of the invention.

A storage device system in accordance with a further embodiment of the invention is shown in FIG. 11. As shown herein, the illustrative system is arranged to employ a storage control device 100 which is made up of an integrated file server 30 and a front end processor 40. This device 100 is called the embedded-type integrated file server.

In the storage device system shown in FIG. 11, an ensemble of work servers 10 and the embedded-type integrated file server 100 plus a previously used or "old" file server 20 are set in a state that these are mutually recognizable and communicable via a third communication network 90. Note that the third communication network 90 as used herein may be any one of special-use or "dedicated" communication lines and currently available local area network (LAN) and wide area network (WAN) which are made up of TCP/IP protocol-based network hardware components.

In the storage device system thus arranged, the embedded integrated file server 100 is used and operated as a master, whereas the old file server 20 is for use as a slave. For example, one of the work servers 10 sends a data input/output request using file identifier assignment toward the front end processor 40 within the embedded integrated file server 100 via the third communication network 90. Here, the front end processor 40 is arranged so that when it determines an execution destination of the data input/output processing in accordance with the request thus received is the old file server 20, this processor 40 transfers this request to the old file server 20.

In the above embodiment also, the front end processor 40 within the embedded integrated file server 100 is expected to perform adequate storage management while organizing management information files into a database. Thus it becomes possible to preclude or at least greatly reduce unwanted spreading of obstacles occurring due to setup errors of the management information files and also any unauthorized access and hacking activities from the outside. This in turn makes it possible to achieve effective handling while letting the old file server 20 to be installed per service user be integrated into the embedded integrated file server 100.

Furthermore, the resultant communication speed or rate between the front end processor 40 and the integrated file server 30 improves by a degree equivalent to the absence of any communication networks as interposed therebetween. Thus it is possible to improve the rate of the processing as to the above-stated functions (accept and integrate/separate functions) of the front end processor 40.

While the invention has been particularly shown and described with reference to specific embodiments thereof, it will be understood by those skilled in the art that the foregoing and other changes in form and details may be made therein without departing from the spirit and scope of the invention.

In accordance with the present invention, it is possible to provide an improved control method of a storage device system, a computer, and a storage control device.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. A method for controlling a storage system including a plurality of host computers, a first storage control device having a first storage device, a second storage control device having a second storage device coupled to said first storage control device, and a computer coupled to said plurality of host computers, said first storage control device, and said second storage control device, wherein said first storage control device is provided with a file system for receiving a data input/output request using file identifier assignment to be sent from at least one of said plurality of host computers and for executing data input/output processing to said first storage device in response to said request thus received, wherein a first file storage region accessible for each of said host computers is kept on a storage region of said first storage device provided in said first storage control device, wherein said computer executes the control method comprising:

storing a first correspondence established between a first identifier (ID) to be assigned for each of said host computers and a file identifier (ID) being added to a file to be stored in said first file storage region;

receiving said data input/output request sent from said host computer, a correspondence being established in said received request between a first ID of a host computer for use as a sending source of said received request and a file ID of a target file of said received request;

comparing said first ID and said file ID of said first correspondence to said first ID and said file ID of said correspondence included in said received request, respectively, to determine whether said received request is accepted or not by checking for a match between the respective IDs; and sending said received request to said first storage control device upon determination of acceptance of said received request as a result of a match between the respective IDs;

wherein said second storage control device with another file system is such that a second file storage region for use as a copy source of the file to be stored in said first file storage region is kept on a storage region of said second storage device equipped by itself, and wherein, replicating files from said second file storage region to said first file storage region, said computer executes the control method further comprising:

storing a second correspondence of a status parameter having a first state indicative of a state before replication and a second state indicating a state after replication and a second ID assigned to said second storage control device plus said first ID of a host computer accessible to said second storage control device;

comparing said first ID which is included in said received request and which is of the host computer that is a sending source of the request to said first ID being stored to said second correspondence;

acquiring said status parameter as corresponding to the first ID matched through said comparison in said second correspondence;

sending said received request to said second storage control device when a content of said acquired status parameter is said first state; and sending said received request to said first storage control device when the content of said acquired status parameter is said second state.

2. A method according to claim 1, wherein said second storage control device stores a third correspondence established between said first ID of a host computer accessible to itself and a file ID being assigned to a file to be stored in said second file storage region accessible by said host computer, and wherein when communicably connecting said second storage control device to said computer and said first storage control device, said computer executes the control method further comprising:

receiving from an input interface said second ID of said second storage control device and said first ID of the host computer accessible to said second storage control device;

storing to said second correspondence said received second ID and first ID along with said status parameter as set in a state;

receiving from said second storage control device said file ID corresponding to said first ID coinciding with said received first ID in said third correspondence, stores said received first ID and file ID in said first correspondence; and storing as said first state the content of said status parameter as stored in said second correspondence.

3. A method according to claim 2, wherein when communicably connecting said second storage control device to said computer and said first storage control device, said computer executes the control method further comprising:

receiving from an input interface said second ID of said second storage control device and said first ID of a host computer accessible to said second storage control device;

providing for a storage device equipped by said first storage control device said first file storage region used for execution of file management by use of a file ID corresponding to said received second ID and first ID;

replicating more than one file to be stored in said second file storage region of said second storage control device with said received second ID added thereto in said first file storage region thus reserved in a way corresponding to said file ID; and storing as said second state the content of said status parameter being stored to said second correspondence.

4. A method according to claim 3, wherein when communicably connecting said second storage control device to said computer and said first storage control device, said computer executes the control method further comprising:

receiving from an input interface said second ID of said second storage control device and said first ID of a host computer accessible to said second storage control device;

acquiring said file ID which is stored in said first correspondence and corresponds to the first ID that coincides with said received first ID;

duplicating in said second file storage region more than one file to be stored in said first file storage region subjected to execution of file management using said acquired file ID; and storing as said first state a content of said status parameter as stored in said second correspondence.

5. A method according to claim 4, wherein when making said second storage control device unable to communicate with respect to said computer and said first storage control device, said computer executes the control method further comprising:

receiving from an input interface said second ID of said second storage control device and said first ID of a host computer accessible to said second storage control device;

deleting in said second correspondence a first ID and a second ID which coincide with said received first ID and second ID together with status parameters corresponding to said first and second IDs; and deleting in said first correspondence the first ID coinciding with said received first ID and said file ID corresponding to the first ID.

6. A method according to claim 5, wherein said file ID is a file name and/or a directory.

7. A computer for use with a storage system including a plurality of host computers, a first storage control device having a first storage device, a second storage control device having a second storage device coupled to said first storage control device, and said computer coupled to said plurality of host computers, said first storage control device, and said second storage control device, wherein said first storage control device is provided with a file system for receiving a data input/output request using file identifier assignment to be sent from at least one of said plurality of host computers and for executing data input/output processing to said first storage device in response to said data input/output request, wherein in said storage system, a first file storage region accessible for each of said host computers is reserved on a storage region of said first storage device equipped by said first storage control device, wherein said computer comprises:

means for storing a first correspondence established between a first ID assigned for each of said host computers and a file ID assigned to a file to be stored in said first file storage region;

means for receiving said data input/output request sent from a host computer, a correspondence being established in said received request between a first ID of a host computer for use as a sending source of said received request and a file ID of a target file of said received request;

means for comparing said first ID and said file ID of said first correspondence to said first ID and said file ID of said correspondence included in said received request, respectively, to determine whether said received request is accepted or not checking for a match between the respective IDs; and means for sending said received request to said storage control device when determining acceptance of said received request as a result of a match between the respective IDs;

wherein said second storage control device with said file system is such that a second file storage region for use as a copy source of the file to be stored in said first file storage region is kept on a second storage region of said second storage device equipped by itself, and wherein, replicating files from said second file storage region to said first file storage region, said computer is configured to:

store a second correspondence of a status parameter having a first state indicative of a state before replication and a second state indicating a state after replication and a second ID added to said second storage control device plus said first ID of a host computer accessible to said second storage control device;

compare said first ID which is included in said received request and which is of the host computer that is a sending source of the request to said first ID being stored to said second correspondence;

acquire said status parameter as corresponding to the first ID matched through said comparison in said second correspondence;

send said received request to said second storage control device when a content of said acquired status parameter is said first state; and send said received request to said first storage control device when the content of said acquired status parameter is said second state.

8. A computer according to claim 7, wherein said second storage control device stores a third correspondence established between said first ID of a host computer accessible to itself and a file ID being assigned to a file to be stored in said second file storage region accessible by said host computer, and wherein when communicably connecting said second storage control device to said computer and said first storage control device, said computer is configured to:

receive from an input interface said second ID of said second storage control device and said first ID of the host computer accessible to said second storage control device;

store to said second correspondence said received second ID and first ID along with said status parameter as set in a state;

receive from said second storage control device said file ID corresponding to said first ID coinciding with said received first ID in said third correspondence, store said received first ID and file ID) in said first correspondence; and store as said first state a content of said status parameter as stored in said second correspondence.

9. A computer according to claim 8, wherein when communicably connecting said second storage control device to said computer and said first storage control device, said computer is configured to:

receive from an input interface said second ID of said second storage control device and said first ID of a host computer accessible to said second storage control device;

provide for a storage device equipped by said first storage control device said first file storage region used for execution of file management by use of a file ID corresponding to said received second ID and first ID;

replicate more than one file to be stored in said second file storage region of said second storage control device with said received second ID assigned thereto in said first file storage region thus reserved in a way corresponding to said file ID; and store as said second state a content of said status parameter being stored to said second correspondence.

10. A computer according to claim 9, wherein when communicably connecting said second storage control device to said computer and said first storage control device, said computer is configured to:

receive from an input interface said second ID of said second storage control device and said first ID of a host computer accessible to said second storage control device;

acquire said file ID which is stored in said first correspondence and corresponds to the first ID that coincides with said received first ID;

duplicate in said second file storage region more than one file to be stored in said first file storage region subjected to execution of file management using said acquired file ID; and store as said first state a content of said status parameter as stored in said second correspondence.

11. A computer according to claim 10, wherein when making said second storage control device unable to communicate with respect to said computer and said first storage control device, said computer is configured to:

receive from an input interface said second ID of said second storage control device and said first ID of a host computer accessible to said second storage control device;

delete in said second correspondence a first ID and a second ID which coincide with said received first ID and second ID together with status parameters corresponding to said first and second IDs; and delete in said first correspondence the first ID coinciding with said received first ID and said file ID corresponding to the first ID.

12. A computer according to claim 11, wherein said file ID is a file name and/or a directory.

* * * * *